United States Patent [19]

Morris et al.

[11] Patent Number: 6,099,723
[45] Date of Patent: Aug. 8, 2000

[54] CATCHBASIN SYSTEMS FOR FILTERING HYDROCARBON SPILLS

[75] Inventors: James F. Morris; Stephen C. Stelpstra, both of Tucson, Ariz.

[73] Assignee: Abtech Industries, Inc., Scottsdale, Ariz.

[21] Appl. No.: 09/092,532

[22] Filed: Jun. 5, 1998

Related U.S. Application Data

[60] Provisional application No. 60/048,789, Jun. 6, 1997.

[51] Int. Cl.[7] .............................. E02B 15/04; B01D 39/00
[52] U.S. Cl. ..................... 210/170; 210/242.4; 210/484; 210/502.1; 210/924
[58] Field of Search ................................... 210/924, 170, 210/163, 484, 282, 242.4, 502.1; 123/579; 95/211, 212, 237, 146; 55/DIG. 42

[56] References Cited

U.S. PATENT DOCUMENTS

| | | |
|---|---|---|
| Re. 29,996 | 5/1979 | Jordan et al. ............................ 210/281 |
| 248,559 | 10/1881 | Jackson . |
| 425,641 | 4/1890 | Van De Walle . |
| 543,740 | 7/1895 | Kuhns . |
| 1,032,700 | 7/1912 | Pickett . |
| 1,164,527 | 12/1915 | Kelly, Jr. . |
| 1,274,227 | 7/1918 | Woodson . |
| 1,471,819 | 10/1923 | Bauschard . |

(List continued on next page.)

FOREIGN PATENT DOCUMENTS

| | | |
|---|---|---|
| 0484061 A1 | 5/1992 | European Pat. Off. . |
| 0518336 A1 | 12/1992 | European Pat. Off. . |
| 136162 | 6/1979 | Germany . |
| 2904428 | 8/1980 | Germany . |
| 3634289 | 4/1988 | Germany . |
| 4-371203 | 12/1992 | Japan . |
| 7109 | 10/1905 | United Kingdom . |
| 13514 | 7/1983 | United Kingdom . |

OTHER PUBLICATIONS

"Innovative Stormwater Treatment Products and Services Guide," prepared for the Stormwater Technologies Trade Shows, Nov. 17 and 19, 1997.
Kristar Enterprises, Fossil Filter, brochure (Sep. 1996).
"Block Copolymers," *Polymer Handbook*, p. 34 (Wiley, 3rd Edition 1989).
"Selection Criteria and Laboratory Evaluation of Oilspill Sorbents," *Environmental Protection Series*, Report EPS 3/SP/3, pp. 1–73 (Jun. 1991).
"Environment Spill Encapsulant Polymers," *IRM Chemical Form 550 product brochure* (Aug. 1993).
Rushefsky, "Old Tires Now Can Now Be Recycled," *Staten Island Advance* (Oct. 22, 1993).
"Titan Tech Attacks Tire Recycling Mess," *American Metal Market* (Oct. 26, 1993).
Alexander, "Bradley is Center of World Attention this Week" *Chickasha Daily Express* (Nov. 4, 1993).
"Business & Technology," *Solid Waste Report*, vol. 24, No. 43, p. 346 (Nov. 4, 1993).
"A Cooler Way to Melt Junked Tires," *Business Week* (Nov. 8, 1993).

(List continued on next page.)

*Primary Examiner*—David A. Simmons
*Assistant Examiner*—Frank M. Lawrence
*Attorney, Agent, or Firm*—Louis J. Hoffman

[57] ABSTRACT

A water- and oil-porous sack contains a hydrophobic, compliant, oil-absorbent, copolymer material arranged in a number of bodies that (a) are generally cylindrical, (b) are porous, (c) have at least one passageway parallel to the axis of the cylinder, and (d) are dimensioned to float on water with the axis parallel to the surface of the water. The material is formed with a binder in a novel extrusion process. The inventive sack is sewn to create a number of pockets, and the seams create fold lines that permit the sack to dip below the water to allow debris to pass. The inventive sacks can be suspended below a storm drain and used in conjunction with known catchbasin inserts.

20 Claims, 4 Drawing Sheets

U.S. PATENT DOCUMENTS

| | | | |
|---|---|---|---|
| 1,935,642 | 11/1933 | Laughlin | 210/45 |
| 2,467,021 | 4/1949 | Fischer | 210/44 |
| 2,557,079 | 6/1951 | Cutri | 294/77 |
| 2,813,745 | 11/1957 | Frieder et al. | 294/77 |
| 2,889,928 | 6/1959 | Sisk | 210/163 |
| 3,147,216 | 9/1964 | Oemler | 21/693 |
| 3,221,888 | 12/1965 | Muller | 210/333 |
| 3,246,582 | 4/1966 | Wade | 94/33 |
| 3,324,630 | 6/1967 | Teller et al. | 95/211 |
| 3,415,745 | 12/1968 | Isaacson | 210/54 |
| 3,494,862 | 2/1970 | Horowitz | 210/693 |
| 3,518,183 | 6/1970 | Evans | 210/40 |
| 3,536,616 | 10/1970 | Kondoh et al. | 210/693 |
| 3,537,587 | 11/1970 | Kain | 210/242 |
| 3,538,020 | 11/1970 | Heskett et al. | 210/502 |
| 3,539,013 | 11/1970 | Smith | 210/242 |
| 3,565,257 | 2/1971 | Cavalieri | 210/242 |
| 3,567,660 | 3/1971 | Winkler | 260/2.3 |
| 3,594,335 | 7/1971 | Schultz et al. | 260/2.5 |
| 3,607,741 | 9/1971 | Sohnius | 210/242.4 |
| 3,607,793 | 9/1971 | Mahlman | 260/93.7 |
| 3,617,565 | 11/1971 | Fahlvik | 210/691 |
| 3,617,566 | 11/1971 | Oshima et al. | 210/242.4 |
| 3,667,235 | 6/1972 | Preus et al. | 61/1 |
| 3,667,608 | 6/1972 | Burroughs et al. | 210/242 |
| 3,679,058 | 7/1972 | Smith | 210/242 |
| 3,681,237 | 8/1972 | Orban | 210/680 |
| 3,702,657 | 11/1972 | Cunningham et al. | 210/242 |
| 3,739,913 | 6/1973 | Bogosian | 210/924 |
| 3,756,948 | 9/1973 | Weinberg | 210/693 |
| 3,783,621 | 1/1974 | Preus et al. | 61/1 F |
| 3,800,950 | 4/1974 | Hess et al. | 210/242.4 |
| 3,831,760 | 8/1974 | Economy et al. | 210/242 |
| 3,837,494 | 9/1974 | Stevenson | 210/259 |
| 3,868,322 | 2/1975 | Orloff | 210/108 |
| 3,888,766 | 6/1975 | De Young | 210/693 |
| 3,915,859 | 10/1975 | Sundin et al. | 210/924 |
| 3,916,969 | 11/1975 | Auerbach et al. | 152/354 |
| 3,923,472 | 12/1975 | Martinez et al. | 44/50 |
| 3,929,631 | 12/1975 | Winkler | 210/36 |
| 4,002,177 | 1/1977 | Rainer et al. | 131/10 R |
| 4,031,839 | 6/1977 | Pedone | 210/924 |
| 4,039,489 | 8/1977 | Fletcher | 260/2.5 AD |
| 4,052,306 | 10/1977 | Schwartz et al. | 210/242 S |
| 4,060,487 | 11/1977 | Samsel | 210/923 |
| 4,061,807 | 12/1977 | Shaler et al. | 210/502 |
| 4,065,923 | 1/1978 | Preus | 61/1 F |
| 4,070,287 | 1/1978 | Wiegand et al. | 210/693 |
| 4,084,380 | 4/1978 | Hallhagen | 61/1 F |
| 4,099,619 | 7/1978 | Hudler et al. | 206/524.1 |
| 4,102,783 | 7/1978 | Zenno et al. | 210/36 |
| 4,111,813 | 9/1978 | Preus | 210/282 |
| 4,206,080 | 6/1980 | Sato et al. | 252/430 |
| 4,207,378 | 6/1980 | Klein | 428/402 |
| 4,248,758 | 2/1981 | Wright | 260/33.6 |
| 4,261,823 | 4/1981 | Gallagher et al. | 210/164 |
| 4,264,444 | 4/1981 | Bronnec | 210/923 |
| 4,332,854 | 6/1982 | Parker | 210/924 |
| 4,366,067 | 12/1982 | Golding et al. | 210/67 I |
| 4,401,475 | 8/1983 | Eriksson et al. | 210/924 |
| 4,419,232 | 12/1983 | Arntyr et al. | 210/164 |
| 4,420,400 | 12/1983 | Weitzen | 210/710 |
| 4,427,157 | 1/1984 | Klein | 210/160 |
| 4,429,065 | 1/1984 | Gancy | 523/223 |
| 4,439,324 | 3/1984 | Crotti | 210/924 |
| 4,454,039 | 6/1984 | McCoy | 210/164 |
| 4,497,663 | 2/1985 | Fisher et al. | 134/4 |
| 4,497,712 | 2/1985 | Cowling | 210/282 |
| 4,519,431 | 5/1985 | Yoshimura et al. | 152/209 R |
| 4,519,918 | 5/1985 | Ericsson et al. | 210/680 |
| 4,560,718 | 12/1985 | Ritchey | 524/13 |
| 4,592,690 | 6/1986 | Busch | 413/19 |
| 4,594,157 | 6/1986 | McGowan | 210/163 |
| 4,640,730 | 2/1987 | Streets et al. | 156/334 |
| 4,672,781 | 6/1987 | Pichon | 52/94 |
| 4,737,394 | 4/1988 | Zafiroglu | 210/694 |
| 4,740,435 | 4/1988 | Markin et al. | 429/174 |
| 4,801,386 | 1/1989 | Sugimori et al. | 210/680 |
| 4,919,820 | 4/1990 | Lafay et al. | 210/671 |
| 4,929,349 | 5/1990 | Beckman | 210/151 |
| 4,941,978 | 7/1990 | Gabrick | 210/693 |
| 4,965,129 | 10/1990 | Bair et al. | 210/924 |
| 4,980,229 | 12/1990 | Park et al. | 428/327 |
| 5,009,790 | 4/1991 | Bustamante et al. | 210/242.4 |
| 5,032,640 | 7/1991 | Fachini | 524/426 |
| 5,037,541 | 8/1991 | Ruey-Jang et al. | 210/141 |
| 5,071,564 | 12/1991 | Stein et al. | 210/924 |
| 5,075,014 | 12/1991 | Sullivan | 210/776 |
| 5,104,548 | 4/1992 | Gabrick | 210/680 |
| 5,133,619 | 7/1992 | Murfae et al. | 404/4 |
| 5,135,578 | 8/1992 | Billings | 210/924 |
| 5,135,660 | 8/1992 | Chromecek et al. | 210/671 |
| 5,159,016 | 10/1992 | Inoue et al. | 525/92 |
| 5,165,821 | 11/1992 | Fischer et al. | 405/63 |
| 5,173,182 | 12/1992 | Debellian | 210/170 |
| 5,179,611 | 1/1993 | Umeda et al. | 405/70 |
| 5,181,802 | 1/1993 | Thengs et al. | 405/70 |
| 5,186,831 | 2/1993 | DePetris | 210/924 |
| 5,207,901 | 5/1993 | Ravagnan | 210/173 |
| 5,211,858 | 5/1993 | Dovan et al. | 252/8.551 |
| 5,227,072 | 7/1993 | Brinkley | 210/924 |
| 5,232,587 | 8/1993 | Hegemier et al. | 210/162 |
| 5,248,729 | 9/1993 | Inoue et al. | 525/92 |
| 5,252,215 | 10/1993 | McFarlane et al. | 210/69.1 |
| 5,256,226 | 10/1993 | Marzola et al. | 156/95 |
| 5,278,217 | 1/1994 | Umeda et al. | 524/394 |
| 5,281,463 | 1/1994 | Cotton | 428/126 |
| 5,297,367 | 3/1994 | Sainz | 52/12 |
| 5,304,311 | 4/1994 | Codiglia | 210/693 |
| 5,324,429 | 6/1994 | Holland | 210/484 |
| 5,330,651 | 7/1994 | Robertson et al. | 210/162 |
| 5,360,548 | 11/1994 | Stein et al. | 210/693 |
| 5,364,535 | 11/1994 | Buckalew | 210/671 |
| 5,374,600 | 12/1994 | Hozumi et al. | 502/402 |
| 5,403,474 | 4/1995 | Emery | 210/163 |
| 5,405,539 | 4/1995 | Schneider | 210/747 |
| 5,407,575 | 4/1995 | Vinsonhaler | 210/924 |
| 5,414,029 | 5/1995 | Lemoine et al. | 524/60 |
| 5,423,985 | 6/1995 | Addeo et al. | 210/924 |
| 5,428,085 | 6/1995 | Burel et al. | 524/59 |
| 5,432,000 | 7/1995 | Young, Sr. et al. | 428/372 |
| 5,439,590 | 8/1995 | Steffan | 210/616 |
| 5,468,539 | 11/1995 | Crivelli | 428/141 |
| 5,480,254 | 1/1996 | Autry et al. | 404/2 |
| 5,496,865 | 3/1996 | Heese et al. | 521/79 |
| 5,516,845 | 5/1996 | Heese et al. | 525/193 |
| 5,573,349 | 11/1996 | Pauluccio | 405/52 |
| 5,624,576 | 4/1997 | Lenhart et al. | 210/767 |
| 5,632,889 | 5/1997 | Tharp | 210/165 |
| 5,641,847 | 6/1997 | Hozumi et al. | 526/328.5 |
| 5,707,527 | 1/1998 | Knutson et al. | 210/660 |
| 5,712,358 | 1/1998 | Sojka | 526/323.2 |
| 5,720,574 | 2/1998 | Barella | 405/52 |
| 5,725,782 | 3/1998 | Chinn et al. | 210/767 |
| 5,744,048 | 4/1998 | Stetler | 210/803 |
| 5,762,790 | 6/1998 | Zoeller | 210/238 |
| 5,767,060 | 6/1998 | Hanrahan | 210/502.1 |
| 5,788,849 | 8/1998 | Hutter, Jr. et al. | 210/163 |
| 5,820,762 | 10/1998 | Bamer et al. | 210/661 |
| 5,830,967 | 11/1998 | Sojka | 526/323.2 |
| 5,834,577 | 11/1998 | Sojka | 526/323.2 |
| 5,849,198 | 12/1998 | Sharpless | 210/693 |

| | | | |
|---|---|---|---|
| 5,863,440 | 1/1999 | Rink et al. ............................... | 210/924 |
| 5,869,555 | 2/1999 | Simmons et al. ........................ | 524/229 |
| 5,955,552 | 9/1999 | Sojka ....................................... | 526/88 |
| 5,958,226 | 9/1999 | Fleischmann ........................... | 210/165 |

OTHER PUBLICATIONS

Schulman, "A New Spin on Old Tires," *Newsweek* (Nov. 15, 1993).

"Titan Develops Tyre & Plastics Recycling," *HazNews* (Nov. 15, 1993).

Kokish, "Titan Opens Pyrolysis Plants in South Korea," *Tire Business* (Dec. 13, 1993).

Metz, "N.M. Firm is Ready to Roll into the Tire Recycling Industry," *The Boston Globe* (Dec. 28, 1993).

"High–Tech Breakthroughs," *Boardroom Reports* (Jan. 1, 1994).

Kansas, "Catalyst and Beams Take Aim at Wastes," *The Wall Street Journal* (Jan. 21, 1994).

"Recycling News," *Green Alternatives*, vol. 4, No. 1 (Feb./Mar. 1994).

"Titan Technologies, Inc.," *Conservative Speculator* (Jun. 1994).

"Titan Technologies, Inc.," *Investor's NewsWire*, pg. All (Sep. 9, 1994).

DiChristina, "Mired in Tires," *Popular Science* (Oct. 1994).

McDonagh, et al., "Handling and Disposal of Oil Waste from Oil Spills at Sea," paper presented at Long Beach Oil Spill Conference (Feb. 27, 1995).

Cassidy, "Titan Potential," *MoneyWorld* (Apr. 1995), pp. 18–21.

Titan Technologies, Inc. Investor's Booklet.

"Petrosorb HGPPL–1 Petroleum Product Spill Encapsulant," *Petrosorb product brochure* (source and date unknown).

"First in Thirst," *Matasorb Industrial Sorbents product brochure* (sourch and date unknown).

Pacific Fluid System, Corp. "Linductor Oil Recovery and Bulk Transfer System Booklet."

"Fact Sheets," *Team One USA Challenger Product Information.*

Fingas, Mervis F., et al. "The Newfoundland Offshore Burn Experiment–Nobe."

Buist, Ian A., et al. "In–Situ Burning of Alaska North Slope Emulsions."

Guenette, Chantal, et al. "Studies of In–Situ Burning of Emulsions in Norway."

Fam, Sami, Michael K. Stenstron, and Gary Silverman, "Hydrocarbons in Urban Runoff," *Journal of Enviromental Engineering*, vol. 113, No. 5, Oct. 1987, pp. 1032–1046.

Shepp, David L., "Petroleum Hydrocarbon Concentrations Observed in Runoff from Discrete, Urbanized Automotive–Intensive Land Uses," *Watershed '96 Conference Proceedings*, pp. 220–223.

Materials re: King County Evaluation of Commercially Available Catch Basin Inserts for Treatment of Stormwater Runoff from Developed Sites, Oct. 1995.

Imtech–Imbibitive Technologies Corporation product literature re "Imbiber Beads," 1993, 1996, 1997.

"HydroCartridges/Rubberizer" product literature, 1994–97.

Aqua Treatment Systems, Inc./"Absorbent W" product literature, 1996–97.

"Innovative Stormwater Treatment Products & Services Guide," prepared for the Stormwater Technologies Trade Shows, Nov. 17 & 19, 1997 (discussing several products, some of which were commercially available before Jun. 1997).

Suntree Isles, Inc. "Curb Inlet Basket" product literature, 1995–96 (and see item A above).

Inventive Resources, Inc. "Water Decontamination" product literature (Apr. 1998).

CATCHBASIN SYSTEMS FOR FILTERING HYDROCARBON SPILLS

CROSS-REFERENCE TO RELATED APPLICATIONS

This application claims the benefit of the filing of U.S. Provisional Patent Application Ser. No. 60/048,789, filed on Jun. 6, 1997.

FIELD OF THE INVENTION

This invention is in the field of systems and methods for recovering hydrocarbons from water that passes into storm drains, catchbasins, or reservoirs.

BACKGROUND OF THE INVENTION

The continuing incidence of oil spillage into storm drains and other water collection systems results in enormous annual costs, both financial and environmental.

Known systems for the clean-up of oil spilled into catchbasins include polypropylene filters, which are inadequate in filtering the oil over a long time and in the large quantities often spilled. In addition, debris often clogs known systems, preventing effective collection of oil. Also, water flow may vary considerably.

There has been a need for some time, therefore, for better oil-recovery systems that would (1) permit more complete cleanup, (2) work for a longer time, (3) contain oil quickly, to collect large "pulses" of oil, (4) permit the oil to be absorbed without being clogged with debris, and (5) to permit oil to be absorbed regardless of water flow rate.

Accordingly, it is a primary object of the present invention to achieve a more effective system for recovering oil from water passing into storm drains or the like.

It is another object of the invention to provide methods and apparatus for effectively containing oil spills flowing into storm drains, over a range of flow rates.

It is another object of the invention to provide methods and apparatus for ameliorating oil spills by entrapping the oil in an oil-sorbent material.

It is another object of the invention to provide a means of improving the collection of spilled oil.

It is another object of the invention to provide collection systems that do not cause debris clogs.

The present invention achieves the above and other objectives by use of a water- and oil-porous sack containing with a hydrophobic, compliant, oil-absorbent, copolymer material arranged in a number of bodies that (a) are generally cylindrical, (b) are porous, (c) have at least one passageway parallel to the axis of the cylinder, and (d) are dimensioned to float on water with the axis parallel to the surface of the water. The material is formed with a binder in a novel extrusion process. The inventive sack is sewn to create a number of pockets, and the seams create fold lines that permit the sack to dip below the water to allow debris to pass. The inventive sacks can be suspended below a storm drain and used in conjunction with known catchbasin inserts.

Other aspects of the invention will be appreciated by those skilled in the art after a reading of the detailed disclosure of the present invention below.

BRIEF DESCRIPTION OF THE DRAWINGS

Common numerals are used in the several figures to indicate similar elements.

DETAILED DESCRIPTION

The system includes the application to the oil spill of sacks containing a quantity of appropriately formed bodies comprising copolymer-based materials that absorb and entrap crude or refined hydrocarbon products, including crude oil of any viscosity and gasoline or other refined fuels. For purposes of this application, the term "oil" refers to any hydrocarbon material.

Figure 1:
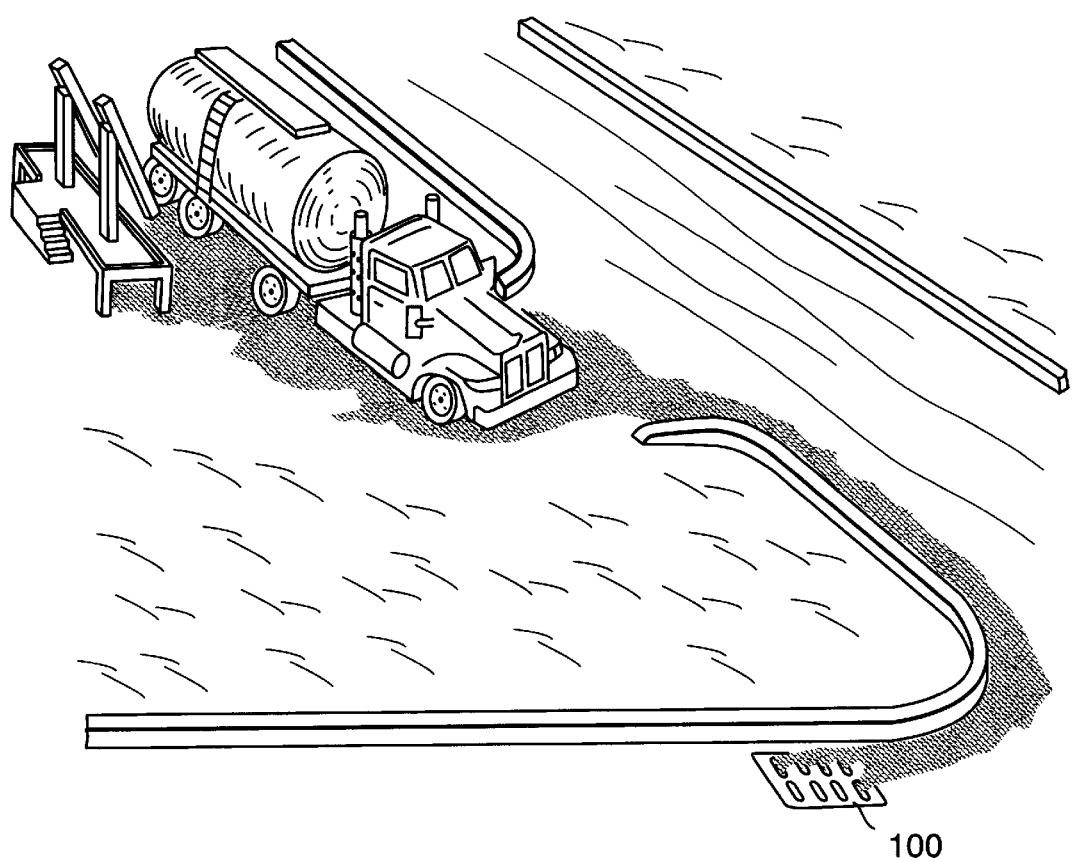
FIG. 1 is an illustration showing an application of the inventive system in connection with a spill.

The inventive system is designed to ameliorate an oil spill such as depicted in FIG. 1, in which oil is accidentally discharged or spilled, such as at a loading terminal, and flows into a fluid receptacle such as a catchbasin or storm drain 100. Drain 100 can be part of a municipal sewer or waste water system or any private collection system, such as a gas station.

Also, oil may be spilled on the ground and subsequent water flow, such as from rain, can cause the oil to flow into catchbasin 100. This is referred to as "non-point-source pollution."

Sack Structure and Deployment

Figure 2:
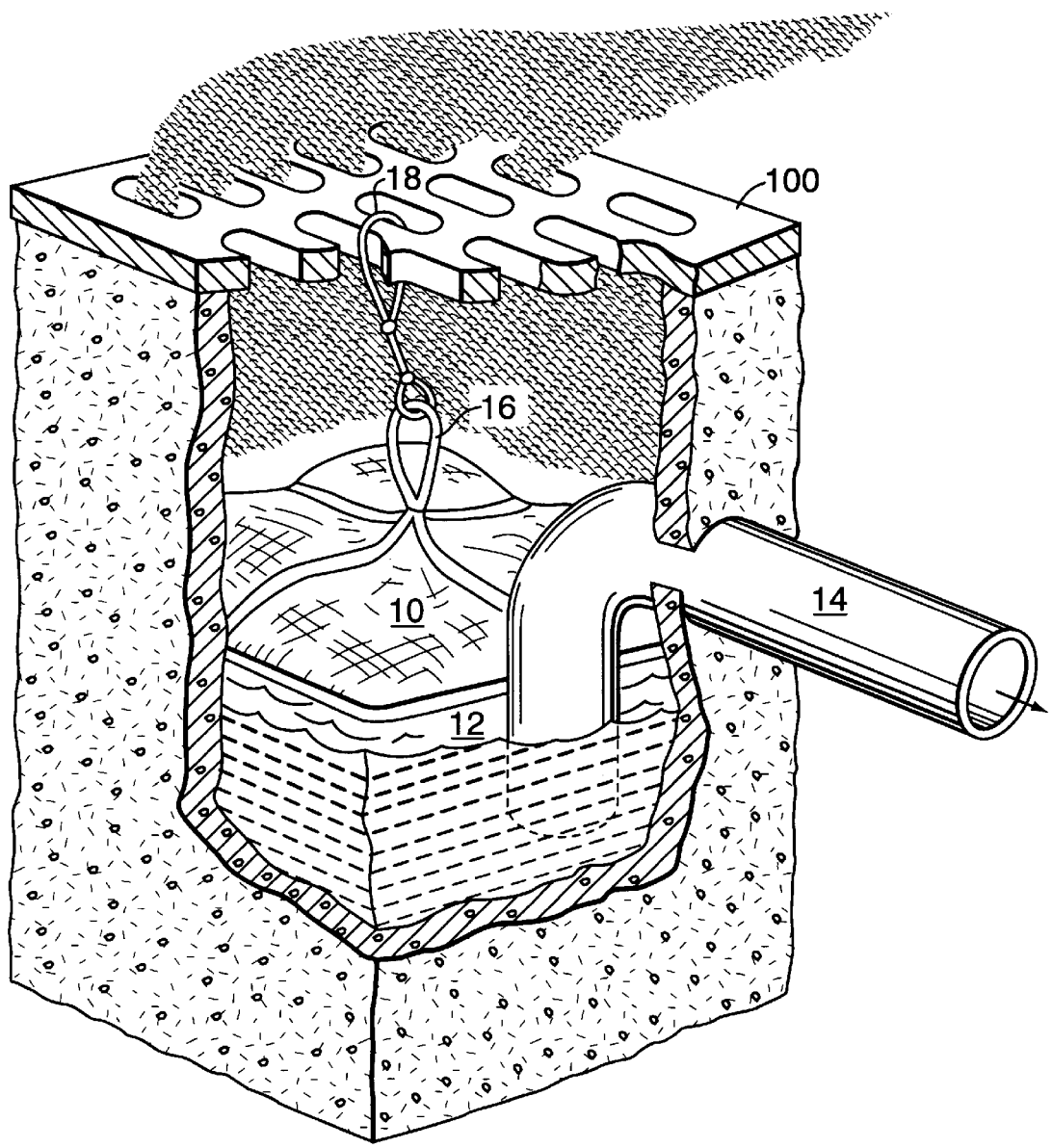
FIG. 2 is a perspective, cut-away view of a storm drain catchbasin having the inventive system installed.

FIG. 2 shows sack 10 suspended below storm drain 100 and floating on waste water 12. Fluids entering the catchbasin, including oil and water, flow through sack 10 into water 12 and ultimately through outlet pipe 14 to a waste water system.

In a preferred embodiment, sack 10 is square, measures about 65 cm. across, and contains about 2.5 kilograms of material that can entrap oil. Although FIG. 2 shows a square sack 10, other configurations, such as rectangular, circular, or irregular, are also possible. Sack 10 can be sized to fit the catchbasin.

Handle 16 is sewn to sack 10 and used to hold it in place below drain 100 with connector strap 18. Alternative forms of attachment are possible, including fasteners (not shown) that connect sack 10 to the walls of the catchbasin, such as located at the middle of each side of the square or rectangular sack 10. Handle 16 can be formed from a strip of material that extends across the top surface of sack 10 or around the top and bottom surfaces, as illustrated in FIG. 2. Alternatively, handle 16 can substantially consist of a strap sewn or otherwise attached to the center of sack 10, as illustrated in FIG. 3.

Sack 10 will float on the surface of water 12, and oil coming into contact with the material contained inside sacks 10 will become entrapped by those copolymers. Because the copolymer material is hydrophobic, however, it will not become water-logged. Further details of the copolymer material are specified below. It has been found that sack 10 containing copolymers will float on the surface of water for at least several months, and perhaps indefinitely, without sinking, releasing the oil, or allowing oil to emulsify.

Sack 10 is formed from two layers of relatively stiff mesh material sewn together. The copolymer-based material described below is placed inside sack 10 between those two layers. The layers can be formed of polypropylene or plastic netting. In one suitable embodiment, a woven plastic mesh with 5 to 7 counts per cm. was used. The material is preferably buoyant and strong. It is necessary, however, that the sack material have enough porosity to allow passage of the spilled oil to the absorbent material contained therein.

Figure 3:
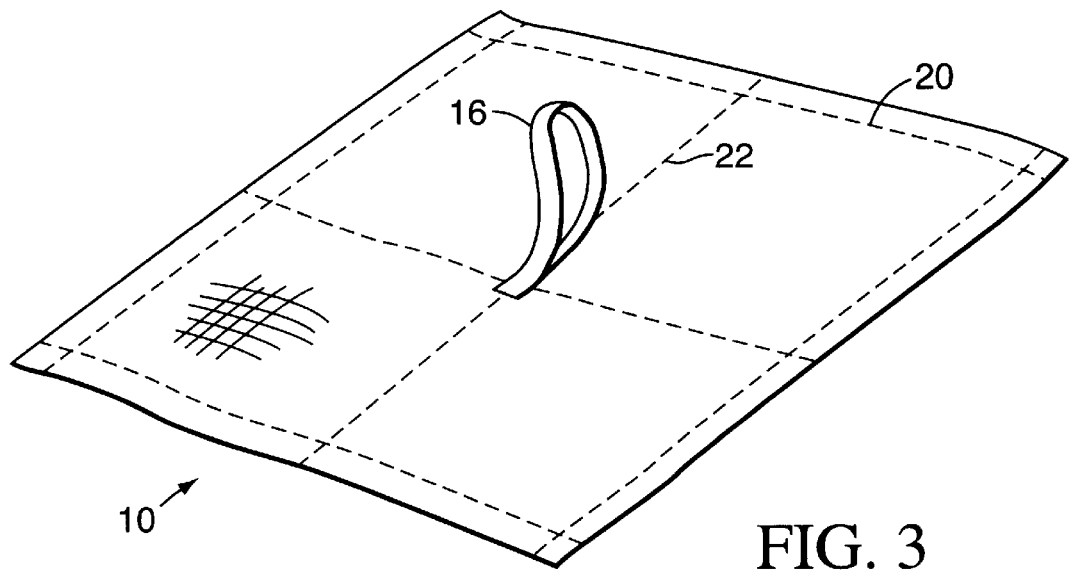
FIG. 3 is a perspective view of a preferred sack used with the inventive system.

As shown in more detail in FIG. 3, the two layers are sew together along peripheral seams 20 to close sack 10. Double and triple stitching, or zigzag stitching, techniques are preferably used to prevent seam rupture or load failures. Other forms of attachment, such as heat bonding, can alternatively be used. Internal seams 22 are also shown in FIG. 3 in the preferred embodiment, dividing the copolymer material among four separate compartments in each quadrant of sack 10. Seams 22 form lines along which sack 10 can easily bend.

The use of internal seams 22 provides two advantages. First, the internal dividers assist in preventing accumulation of copolymer material at certain spots within sack 10. Second, seams 22 form bend lines, which allow clearing of debris.

Regarding the first point, the effectiveness of the system is at its highest when the copolymer bodies disburse uniformly throughout the entire width of sack 10, as opposed to being formed into a pile. This permits coverage of substantially the entire surface of water 12 with a minimum of copolymer material. Also, dispersion prevents copolymer bodies from forming into layers that can cause one such body to block another from encountering oil flowing into the catchbasin.

Regarding the second point, debris such as leaves, trash, and twigs tend to flow into storm drains 100, particularly during storms or other times of high water flow. While debris does not hamper the filtering qualities of sack 10, it is also important that sack 10 not clog or restrict the storm drain. The preferred embodiment of sack 10 is capable of permitting clearing of even substantial quantities of debris accumulated in drain 100 on top of sack 10. When the quantity of debris weighs enough to overcome the buoyancy of the material in any two adjacent quadrants of sack 10, those quadrants will sink, and sack 10 will bend along internal seams 22, dipping below the water surface. The flow of water or the weight and lack of buoyancy of the debris itself will then cause the debris to pass below sack 10 and become partially or completely submerged, permitting it to exit outlet pipe 14 (see FIG. 2). After the debris clears, the submerged quadrants of sack 10 will float again to the surface.

In the preferred embodiment, approximately 20 copolymer bodies of the sort shown in FIG. 5 and described below are contained in each quadrant of sack 10 of FIG. 3.

Figure 4:
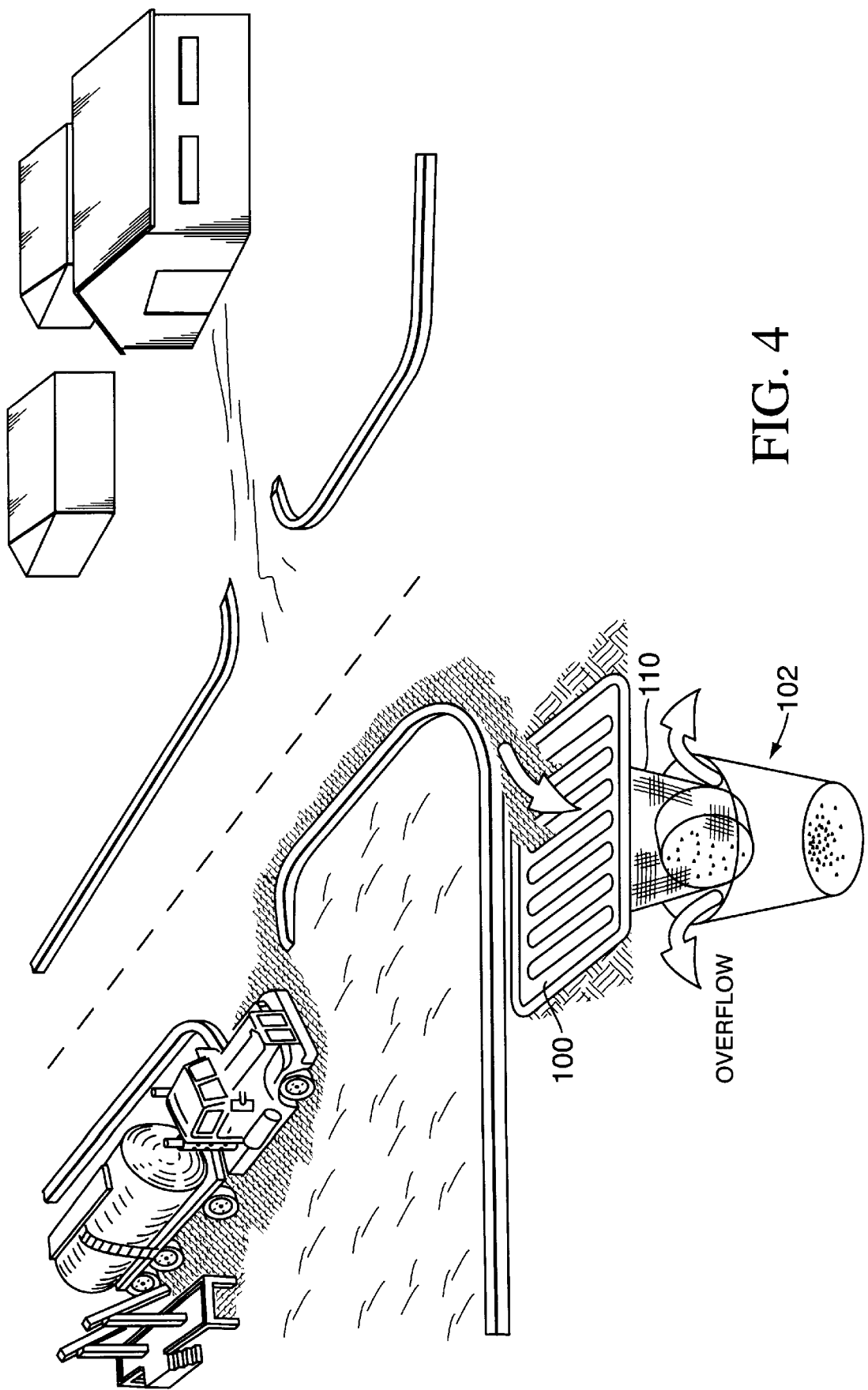
FIG. 4 is a perspective view of a known catchbasin insert with an alternative embodiment of the inventive system.

FIG. 4 shows an alternative embodiment of the invention, in which catchbasin 100 is fitted with catchbasin insert 102, known in the art. Insert 102 permits fluid overflow as shown by the arrows in the figure. Placed inside insert 102 is a bag 110 containing copolymer bodies of the sort shown in FIG. 5 and described below, or alternatively smaller pieces of the same copolymer material, from pea size to gravel size (as shown in FIG. 4). In the alternative form, the smaller pieces can be formed by cutting or pulling apart copolymer bodies formed as described below or independently.

The embodiment of FIG. 4 adapts the invention for use in storm drains that include inserts like 102.

Copolymer Bodies

Figure 5:
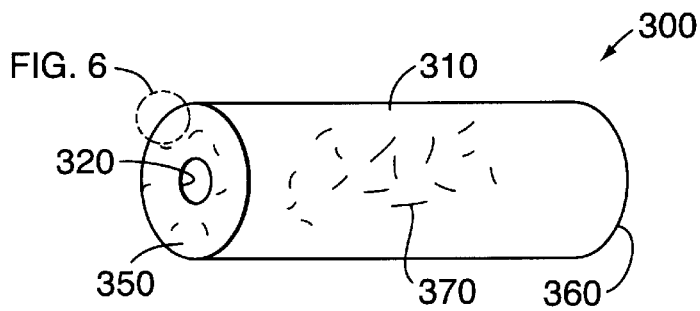
FIG. 5 is a perspective view of a preferred form of copolymer body used in the preferred sack of FIG. 3.

FIG. 5 shows an example of a suitably formed copolymer body 300, for use inside sack 10.

The principal ingredient of bodies 300 is a copolymeric material that is known to sorb oil but not water. Preferably, the material is compliant or flexible.

Particularly suitable types of copolymers fall within the class of thermoplastic elastomers, such as styrene-butadiene-styrene ("SBS"), which is a styrenic block copolymer. Styrenic block copolymers were developed for applications that require impact resistance, and this is still their primary use. SBS is highly sorbent, non-toxic, and remains coherent after it is oil saturated. An alternative styrenic block copolymer is styrene-isoprene-styrene ("SIS").

In a preferred embodiment formed in accordance with the preferred process described below, SBS material formed into granules is mixed with granulated binder material. In that embodiment, granular porous SBS with about 30% styrene has been found suitable, when sifted to retain particles in the range of sizes between 4 and 24 mesh. Preferably, the SBS product is manufactured without talc, contrary to the standard manufacturing process, to enhance inter-granular bonding in the formed body.

The binder material is a compliant or flexible, hydrophobic, olefinic polymer material in a granular form and having a melting point lower than that of the oil-absorbent copolymer. Polyolefin thermoplastic elastomers, such as ethylene propylene ("EP") rubber or ethylene propylene diene monomer ("EPDM") have been found suitable. The binder prevents formed bodies 300 from crumbling while being handled in dry form, yet also absorbs a certain quantity of oil. In a preferred embodiment, EPDM granules sifted to retain particles between 12 and 24 mesh have been found suitable.

About 70–90% by weight of the material of bodies 300 consists of SBS and the remainder of EPDM binder. As explained below, the SBS and EPDM granules are mixed and formed into bodies 300 in a way that results in SBS granules in an EPDM matrix.

Because of the desire, as noted above, to allow the copolymer material to remain in a flat layer, it is desirable to create a relatively large body 300, so that the material does not pile on top of itself. An additional advantage is that a relatively large body 300 is less likely to accidentally fall out of the bag. However, large bodies result in a greater distance between outer surface 310 and center surface 320, which is disadvantageous because oil would require a much longer time of exposure to soak into the center. Because in real oil spills, a particular quantity of oil may encounter body 300 only sporadically, in a large body, the center material largely remains unused.

A preferred embodiment that solves this dilemma uses a generally tube shape for bodies 300. For example, a cylinder with an outer diameter from about two to five centimeters has an hole about one to two centimeters in diameter along the longitudinal axis, resulting in a body 300 that has all of its material less than about a centimeter or two from the nearest surface.

The relatively large inner hole allows water and oil to pass through and between the bodies 300 easily, thereby improving the chances of oil encountering a copolymer surface. Also, removal of material from the center of body 300 reduces the amount of material in each body, without significantly reducing the quantity of oil absorbed, which further improves the quantity of oil entrapped per unit quantity of copolymer.

Multiple holes parallel to the cylinder's axis can be used in addition to the axial hole or instead of it. For example, in one arrangement (not shown) three holes are arranged on radial planes separated by 120° C. angles, the holes being equidistant from the axis of the cylinder. This arrangement permits enhanced flow-through of oil even if the oil layer does not intersect the cylinder along the axis, for example if some of the bodies 300 are partly submerged.

Bodies 300 should be formed with a length exceeding the outer diameter of the cylinder. This restriction is important, because it ensures that bodies 300 will float on the water with the axial hole parallel to the surface of the water, permitting better pass-through of oil. When afloat in oily water, bodies 300 tend to physically block pockets of oil from flowing to other bodies 300 outside those pockets. The inclusion of axial holes, and their orientation parallel to the surface of the water, counteracts this tendency. In addition, in some circumstances, the preferred hole orientation permits more oil to remain inside the axial passageway, permitting more time to complete the absorption process.

Bodies 300 can be supplemented with different-shaped bodies in sacks 10. Using such a mixture of bodies 300 is advantageous over the use of a uniform type of body, because regular-shaped bodies can become arranged in a more fitted-together fashion, reducing the quantity of interstitial space, which thereby lowers the encounter rate.

The generally cylindrical exterior 310 of bodies 300 is preferred, as it reduces the area of contact between adjacent bodies 300. The pressure from many bodies 300 in sack 10 and the softness of the constituent materials tends to meld bodies 300 together, with the consequential tendency to lower the encounter rate. A reduced contact area counters this undesired effect.

Another undesired effect is called "matting" or "gel blocking," in which the first quantity of absorbed oil combines with an outer layer of grains in body 300 to form a barrier, preventing unabsorbed oil from continuing into the part to reach inner layers of grains and be absorbed thereby.

To increase the surface area of the bodies 300, consequently permitting faster oil absorption and less gel blocking, without increasing the distance from surface to center, it is desirable to have inner and outer surfaces 310 and 320 roughened somewhat. The same is true of end surfaces 350 and 360. The preferred process of formation discussed below promotes this goal. Alternatively, cutting or stamping bodies 300 from sheets of molded material has been found to roughen surfaces 310, 320, while first cutting the sheets from blocks roughens surfaces 350,360. Also, the sheets or parts can be molded in a rough-sided dimple mold.

Also to reduce gel blocking, bodies 300 preferably have numerous fissures 370 extending into bodies 300 from some or all exterior surfaces and passing between the grains of SBS. Again, the preferred formation process discussed below promotes this goal.

In one example, a body 300 measuring about 4 cm. across and about 7 cm. long, with a 1 cm. diameter axial hole, was found suitable. That body 300 was formed of 78% SBS and 22% EPDM and had a bulk density of about 0.6 g/cc and weighed about 35 grams. The bodies can absorb up to 10 times their weight in oil.

The bulk density of the resulting body is controlled, also to reduce gel blocking. With the preferred bulk density, the SBS granules in bodies 300 are also less likely to clump to each other when soaked with oil, which also improves sorbency. Similarly, the SBS grain sizes identified above are selected to avoid gel blocking from either overly large chunks or agglomerated small-diameter, powdery particles.

With the preferred materials discussed above, bulk density greater than 0.75 g/cc tend to prevent the oil from entering the bodies, while bulk density smaller than 0.35 g/cc cause the bodies to fragment, either when dry or after absorbing oil. For example, copolymer bodies with a bulk density in the preferred range have enough inter-granular voids to permit oil to penetrate substantially throughout the thickness of bodies 300 without causing them to fall apart.

Forming the Copolymer Bodies

One method of forming bodies 300 applies a modified extrusion process. SBS and EPDM granules are placed in the hopper of an extruder of conventional design, for example, a two-inch Bonnot lab extruder with a hot-water external barrel heater. The extruder heats the granular material to a temperature not exceeding 120° F., far below normal extrusion temperatures for plastic products, and preferably about 105° F.

In the barrel of the extruder, the EPDM quickly become plasticized, as a result of heat, pressure, and mechanical agitation by the screw and barrel in combination. The extruder's screw mixes the plasticized EPDM and the unmelted SBS, forming a matrix of EPDM surrounding SBS granules. Because the SBS is not melted, some air bubbles remain in the mixture. The softening process occurs quite rapidly in the extruder, permitting very short dwell times (such as less than one minute), which permits rapid manufacturing.

The partially plasticized composite material is pressed through a circular die with a central rod or mandrel, at a flow rate of about 6 g/sec. To form the cylindrical structure with the axial hole shown in FIG. 5. In one example, a 10 cm. long die was used.

Upon passing through the die, the SBS granules, which have been compressed somewhat by being forced through the die, re-expand, "fluffing" the extruded material while it cools and hardens. The expansion is further assisted by air remaining in the mixture. The extruded material is cut into suitable lengths to form the final bodies 300.

Figure 6:
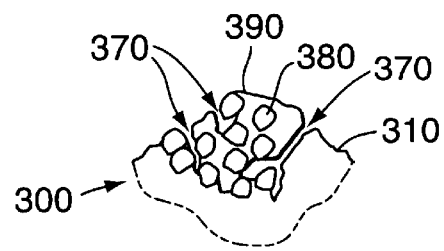
FIG. 6 is a detail view of a cross-section of the preferred body, such the one shown in FIG. 5.

When cooled and resolidified outside the extruder, the EPDM matrix 390 (see FIG. 6) forms a durable but permeable structure for the SBS granules 380 and provides mechanical integrity to the resulting bodies 300. Thus, bodies 300 formed in accordance with the preferred method do not break or crack absent extreme elastic deformation, despite the presence of fissures 370. Also, fragments of such bodies do not detach easily from bodies 300 in the form of flakes, crumbles, or dust, even with rough handling.

The fluffing effect (typically undesired in extrusion processes) is beneficial because it forms inter-granular fissures 370 in the EPDM matrix, throughout the structure. However, the fissuring is not so great as to cause loss of structural integrity. As noted above, fissures are preferred to facilitate rapid passage of oil into bodies 300 and to reduce the incidence of gel blocking, permitting continued absorption.

Although the invention has been described with reference to specific embodiments, many modifications and variations of such embodiments can be made without departing from the innovative concepts disclosed. Thus, it is understood by those skilled in the art that alternative forms and embodiments of the invention can be devised without departing from its spirit and scope.

We claim:

1. A device for separation of hydrocarbons from flowing water comprising:

(a) a sack comprised of a mesh material that is porous to both water and oil;

(b) wherein each sack forms a plurality of separate compartments, each containing a material buoyant in water; and (c) a multitude of bodies contained within at least one of the compartments, each of the bodies being buoyant in water;

(d) wherein each of the bodies is comprised of styrene-butadiene-styrene and ethylene propylene diene monomer.

2. The device of claim 1 wherein the sack is square and is formed into four compartments, each having a corner at the center of the square.

3. The device of claim 1 wherein the sack is rectangular and is formed into four compartments by a pair of division lines that intersect at right angles.

4. The device of claim 1 further comprising a handle coupled to the outside of the sack.

5. The device of claim 4 wherein the sack is square and is formed into four square compartments by a pair of division lines that intersect at right angles, and wherein the handle is connected to the sack at the intersection.

6. The device of claim 5 wherein the sack is sewn together along the division lines.

7. The device of claim 5 wherein the handle is formed from a strip of material extending across the top surface of the sack.

8. The device of claim 5 further comprising strips of material sewn along the pair of division lines separating the compartments of the sack.

9. The device of claim 1 wherein the sack is sized to fit a catchbasin in which it is intended to be placed.

10. The device of claim 1 wherein each of the multitude of polymer bodies is a tubular body formed to surround an axial hole of the polymer body and that has its longest dimension parallel to the center axis of the axial hole.

11. The device of claim 1 further comprising a multitude of additional bodies, of a different shape that are also comprised of an oil-entrapping polymer and also contained within the sack.

12. The device of claim 1 wherein the sack is rectangular, and further comprising attachment devices on each edge at the perimeter of the sack.

13. The device of claim 1 wherein each of the multitude of bodies substantially consists of styrene-butadiene-styrene block copolymer and ethylene propylene diene monomer.

14. The device of claim 13 wherein each of the multitude of bodies consists of styrene-butadiene-styrene block copolymer and ethylene propylene diene monomer.

15. The device of claim 14 wherein the ethylene propylene diene monomer is in the range of about 10–30% by weight.

16. The device of claim 13 wherein the external surfaces of each of the multitude of polymer bodies contain a multitude of fissures.

17. The device of claim 1 wherein, for each of the multitude of polymer bodies, the styrene-butadiene-styrene is predominately in the form of a multitude of granules and the ethylene propylene diene monomer is predominately in the form of a multitude of granules, and where the multitudes of granules are bound together.

18. The device of claim 17 wherein each of the multitude of polymer bodies is formed from a multitude of granules of styrene-butadiene-styrene block copolymer in the range of about 4°20 mesh and lacking talc.

19. The device of claim 17 wherein the multitude of granules of styrene-butadiene-styrene have been unmelted and the multitude of granules of ethylene propylene diene monomer have been plasticized.

20. The device of claim 19 wherein each of the multitude of polymer bodies:

(a) is a tubular body formed to surround an axial hole of the polymer body and that has its longest dimension parallel to the center axis of the axial hole;

(b) substantially consists of styrene-butadiene-styrene block copolymer and ethylene propylene diene monomer; and (c) has an external surface containing a multitude of fissures.

\* \* \* \* \*

UNITED STATES PATENT AND TRADEMARK OFFICE
CERTIFICATE OF CORRECTION

PATENT NO. : 6,099,723
DATED : August 8, 2000
INVENTOR(S) : James F. Morris and Stephen C. Stelpstra It is certified that error appears in the above-identified patent and that said Letters Patent is hereby corrected as shown below:

Title page, other publications,
The reference entitled
"Environment Spill Encapsulant Polymers," change the journal name from
"IRM to -- JRM --.
Page 3,
The reference entitled "Titan Develops Tyre & Plastics Recycling," change the date of the article from "(Nov. 15, 1993)" to -- (Dec. 1993) --

Column 7,
Line 29, change "1" to -- 17 --
Line 33, change "1" to -- 10 --

Signed and Sealed this

Eighteenth Day of September, 2001

Attest:

NICHOLAS P. GODICI
*Attesting Officer*  *Acting Director of the United States Patent and Trademark Office*

UNITED STATES PATENT AND TRADEMARK OFFICE
CERTIFICATE OF CORRECTION

PATENT NO. : 6,099,723
DATED : August 8, 2000
INVENTOR(S) : James F. Morris and Stephen C. Stelpstra It is certified that error appears in the above-identified patent and that said Letters Patent is hereby corrected as shown below:

Title page,
Item [30], Related U.S. Application Data, change "60/048,789" to -- 60/048,798 --.

Column 1,
Line 7, change "60/048,789" to -- 60/048,798 --.

Signed and Sealed this

Twentieth Day of September, 2005

JON W. DUDAS
*Director of the United States Patent and Trademark Office*